(12) United States Patent
Gurevitz et al.

(10) Patent No.: US 12,456,996 B2
(45) Date of Patent: Oct. 28, 2025

(54) METHOD AND APPARATUS TO MITIGATE PLATFORM NOISE AND INTERFERENCE INCURRED AT A WIRELESS DEVICE COUPLED TO THE PLATFORM

(71) Applicant: Intel Corporation, Santa Clara, CA (US)

(72) Inventors: Assaf Gurevitz, Ramat Hasharon (IL); Shahrnaz Azizi, Cupertino, CA (US); Amir Rubin, Kiryat Ono (IL); Eduardo Alban, Hillsboro, OR (US); Hector Cordourier Maruri, Guadalajara (MX); Janardhan Koratikere Narayan, Fremont, CA (US); Jie Gao, Sunnyvale, CA (US); Jose Rodrigo Camacho Perez, Guadalajara (MX); Shlomi Vituri, Tel Aviv (IL); Vinod Kristem, San Jose, CA (US); Ivan Simoes Gaspar, West Linn, OR (US); Amer Al-Baidhani, Cincinnati, OH (US)

(73) Assignee: Intel Corporation, Santa Clara, CA (US)

(*) Notice: Subject to any disclaimer, the term of this patent is extended or adjusted under 35 U.S.C. 154(b) by 525 days.

(21) Appl. No.: 17/932,318

(22) Filed: Sep. 15, 2022

(65) Prior Publication Data
US 2023/0098162 A1    Mar. 30, 2023

(30) Foreign Application Priority Data
Sep. 24, 2021   (EP) ..................................... 21198760

(51) Int. Cl.
*H04B 1/10*     (2006.01)
*H04B 17/345*   (2015.01)

(52) U.S. Cl.
CPC ............. *H04B 1/10* (2013.01); *H04B 17/345* (2015.01)

(58) Field of Classification Search
CPC ...... H04B 1/10; H04B 17/345; H04B 1/1027; H04B 1/123
See application file for complete search history.

(56) References Cited

U.S. PATENT DOCUMENTS

| | | | |
|---|---|---|---|
| 2008/0139155 A1* | 6/2008 | Boireau | H04B 15/04 455/296 |
| 2010/0303182 A1 | 12/2010 | Daneshrad et al. | |
| 2020/0235765 A1* | 7/2020 | Azizi | G06N 3/08 |

FOREIGN PATENT DOCUMENTS

EP    2888821 A1   7/2015

\* cited by examiner

*Primary Examiner* — Ayodeji O Ayotunde
(74) *Attorney, Agent, or Firm* — SPL Patent Attorneys PartG mbB; Yong Beom Hwang

(57) ABSTRACT

A method and apparatus to estimate and mitigate platform noise incurred at a wireless device coupled to the platform. A computing device includes a platform including a first processor, a wireless device coupled to the platform, the wireless device including a second processor, and a plurality of antennas coupled to the wireless device. At least one of the first processor or the second processor is configured to determine characteristics of a platform noise incurred at the wireless device in real-time due to utilization of circuitries and processing components on the platform and implement an adaptive real-time and application/context-aware measure to mitigate the platform noise based on the determined characteristics of the platform noise.

10 Claims, 15 Drawing Sheets

METHOD AND APPARATUS TO MITIGATE PLATFORM NOISE AND INTERFERENCE INCURRED AT A WIRELESS DEVICE COUPLED TO THE PLATFORM

FIELD

Examples relate to a computing device including a wireless modem device, more particularly a method and apparatus to estimate and mitigate platform noise and interference incurred at a wireless device coupled to the platform.

BACKGROUND

Laptops, tablet computers, or other personal computing devices have evolved into different form factors to meet a variety of requirements for users from garners to professionals such as engineers, mathematicians, artists to students to senior citizens. To satisfy each group of users, platforms of those computing devices have different features from high-resolution display, high connectivity throughput, and low latency to performing intense computation very fast to ease of use. Regardless of the targeted users, the trend has been for the platform to be thin, light, and wirelessly connected to the internet and other devices.

The inclusion of wireless technologies to the platforms of computing devices introduced a new challenge to the platform designers which was mitigating the intentional and unintentional electromagnetic radiation picked at the antenna of wireless devices as noise. Cellular carriers set sensitivity limits for all devices carrying wireless wide area network (WWAN). There have been efforts to meet certain sensitivity levels to meet certification. Despite all the efforts, platform noise continues to be a problem that impacts Wi-Fi or cellular performance. In general, platform noise is more significant for the 2-in-1 devices and small form factor personal computers (PCs) because of the proximity of the antenna to the platform noise sources. The noise will degrade the wireless receiver sensitivity and impact the downlink throughput as well as impacting the wireless access point link adaptation, and hence overall user experience.

A conventional solution for preventing a platform noise was that manufacturers add absorbers over the platform components. For example, electro-magnetic interference (EMI) coating or copper tapes are applied over the potential sources of noise (e.g., a memory) to shield the noise. This costly solution requires tremendous time-consuming trial and error, which is often implemented only on high-end and expensive laptops. Most laptop platforms need to bear with the performance degradation. In some cases, after tremendous effort in root causing and testing, a post-production platform-specific solution/work-around is implemented and installed as the manufacture-specific patch or driver update.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
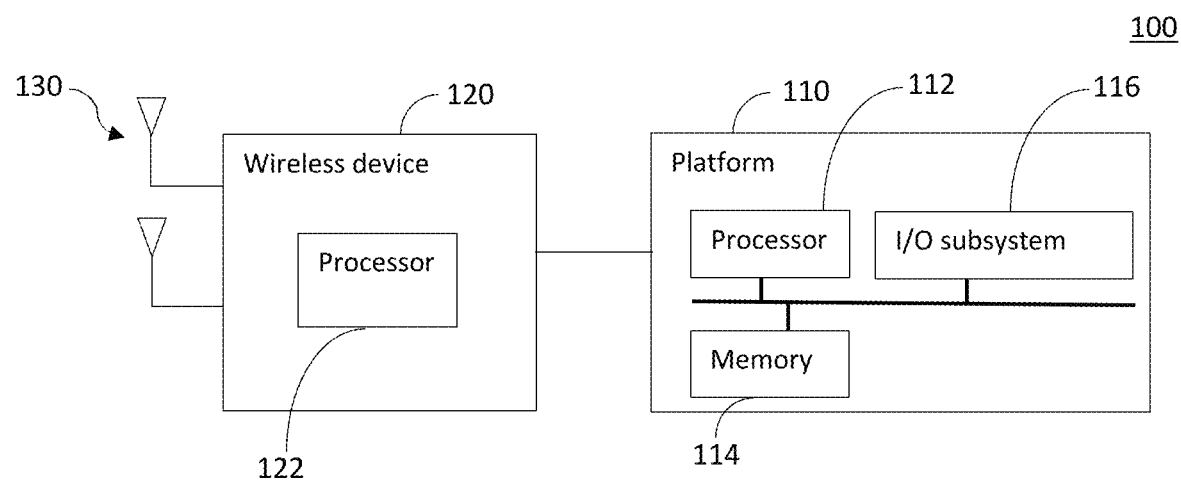
FIG. 1 is a block diagram of an example computing device that is configured to estimate and mitigate platform noise.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Most recently, the upcoming operation of Wi-Fi in the 6-7 GHz band has raised a new issue with Low-Power Double Data Rate (DDR) memories on a platform because DDR memories will generate noise in the 6-7 GHz band for Wi-Fi. In addition, the new amendment 11be of the IEEE 802.11 standards will allow multi-link operation (MLO) in different bands, which in turn will make it more challenging to mitigate the noise using traditional techniques as explained below.

Through analysis of many noise measurements from a variety of platforms using an Intel noise diagnostic tool (NDT) or lab equipment such as transceiver and spectrum analyzer, it has been confirmed that often there is an antenna noise imbalance. The reason is that one antenna may be closer to the source of the noise on the platform or the cable routing to one antenna passes closer to the sources of platform noise compared to the other cable to the other antenna. Having different level of noise/interference at different antennas is a very common problem on laptop platforms or other computing device platforms such as smartphone because antennas are at different locations where the proximity of one to a noisy component (such as DDR memory) is different from another. The cable-routing from antennas to wireless device antenna ports are different for two antennas and often one passes by a noisy component while others do not.

Adaptive clocking technology may enable context-aware adaptive platform noise mitigation, which varies depending on the clock frequency and utilization of the different platform components such as memory, PCIe, graphics processing unit (GPU), etc. The adaptive clocking technology-based mitigation schemes avoid the presence and generation of specific clock harmonics, which falls on the wireless device (e.g., Wi-Fi device) operating channel. In this method, the Wi-Fi device reports the carrier frequency of its operating channel to the platform system, and then, the clock frequency of the interfering components on the platform may be tuned such that its harmonics will not interfere with the Wi-Fi channel. This one-way communication between the Wi-Fi device to the platform has been a good solution to reduce the interfering clock harmonics with the Wi-Fi channel. However, with the increased number of the Wi-Fi channels in 6 GHz and the upcoming concurrent dual-radio and MLO operations, along with the enabling seamless multi-radio (Wi-Fi, cellular such as Fourth Generation (4G) or Fifth Generation (5G), etc.) connectivity feature, it will be a difficult task to avoid interference on operating channels by only tuning the clock frequency.

The adaptive clocking technology-based solution does not enable a bi-directional collaboration and exchange of information between the platform and the wireless device where the wireless device can change its mode of operation, for example, to avoid using the antenna which encounters considerable noise by switching from multiple-input multiple-output (MIMO) to single-input single-output (SISO).

Hereafter, examples are disclosed for techniques to mitigate the platform noise incurred at the wireless device when noise levels at different antenna ports are at different levels and/or are correlated between the antennas. Examples disclosed herein provide novel noise estimation and mitigation techniques exploiting the characteristics of the platform noise. Implementing the examples disclosed herein would provide better performance for the end-users by increasing throughput and decreasing latency due to a better signal-to-interference and noise ratio (SINR) point of operation for wireless devices.

In a first example, real-time information regarding the platform noise may be sent by the platform to the wireless device (i.e., to the wireless device driver/firmware (FW)) to be used for dynamic noise mitigation at the wireless device. The platform noise information may be pre-measured and stored in a look-up table (LUT) and selected based on the platform activities, or alternatively may be predicted with machine learning (ML) techniques and/or pre production trainings based on the platform activities.

For example, the antenna noise covariance matrix may be determined (pre-measured or predicted) by the platform and eigen value decomposition or singular value decomposition (SVD) may be performed on the noise covariance matrix either by the platform or by the wireless device to find the eigen vector corresponding to the smallest eigen value. The eigen vector is used by the wireless device for projecting the received signal toward the less noisy direction in time domain. Optionally, the inverse of noise covariance matrix may be applied to the received signal for the frequency domain whitening.

In a second example, the knowledge of antenna noise imbalance may be exploited in mitigating the noise by a simple per-antenna gain setting. In this example, the RF gain setting may be done per antenna chain depending on the noise power of each antenna. The wireless device may measure the noise power on each antenna and apply the RF antenna gain to each antenna based on the measured noise power on each antenna. Alternatively, the wireless device can obtain such information from a platform LUT or from the output of ML-based noise characterizer.

In a third example, the wireless device may measure the characteristics of the platform noise on the antennas and determinate the noise covariance matrix and the eigen vector with the smallest eigen value for packet-by-packet noise/interference mitigation. In this example, the noise estimation and processing of the covariance matrix and eigen vector computation are performed at the wireless device, which does not require measuring/predicting noise at the platform. The antenna noise covariance matrix and the eigen vector of the noise covariance matrix corresponding to the smallest eigen value may be determined and used for projecting the received signal toward the less noisy direction in time domain. Optionally, the inverse of the noise covariance matric may be applied for frequency domain whitening.

In a fourth example, machine learning (ML)-based spectral analysis may be performed to generate a spectral mask based on the monitored platform activities, and the spectral components of the received signals may be scaled with the spectral mask by the wireless device while the phase of the received signals is preserved. In this example, the platform monitors activities on the platform, determines the characteristics of the platform noise, and generates a spectral mask based on the determined characteristics of the platform noise and the prior training-based mask prediction. Similar to the first example, this method relies on the noise measurement and prediction from the platform. However, the platform provides the spectral mask to the wireless device, and the wireless device scales the amplitude component of the received signal with the spectral mask.

One or more of the above examples may be combined. For example, the third example may leverage from the information available from the platform. In this case, the estimation in the wireless device may be enhanced based on the long-term average information provided by the platform. The noise characteristics of the platform is learnt through prior test cases running different applications. For example, a gaming application that utilizes a GPU and a lot of memory read/write can be used during the testing phase to populate an LUT of noise characteristics associated with the gaming application such as the bandwidth of the noise is 10 MHz wide centered at 5220 MHz. This long-term information can be used during runtime by the Wi-Fi device to only take into consideration the 10 MHz bandwidth of its noise estimated and ignore the noise estimate outside the 10 MHz bandwidth identified by the platform.

According to the evaluation based on simulations, all the above examples provide performance gains, which will be explained below. The example schemes disclosed herein provide improved wireless performance that is needed for emerging low latency and high throughput applications such as wireless gaming.

FIG. 1 is a block diagram of an example computing device 100 that is configured to estimate and mitigate platform noise. The computing device 100 may be included in a laptop computer, a tablet computer, or any other computing devices. The computing device 100 includes a platform 110, a wireless device 120 (a wireless modem), and a plurality of antennas 130. The computing device 100 may include any number of antennas (e.g., two, four, or more than four). A platform noise is incurred at the platform 110 due to electromagnetic radiations generated due to the utilization of the circuitries and components on the platform 110 and picked up by the antennas 130, which impacts the performance of wireless device 120. The platform noise may be incurred due to activities of, for example, DDR memories, PCIe bus, processors such as GPUs or hardware accelerator, input/output (I/O) interfaces, etc.

The platform 110 is a system that includes hardware devices, circuitries, components and an operating system that an application, program, or process runs upon. The platform 110 includes a processor(s) 112, a memory 114, an I/O subsystem 116, and a bus interface, etc. The platform 110 can also have processing circuitries used for wireless transmission and reception.

The wireless device 120 is coupled to the platform 110. The wireless device 120 includes a processor 122 and other processing components/circuitries for wireless transmission and reception, such as radio frequency (RF) front-end circuitry/processor and baseband processing circuitry/processor (not shown). The wireless device 120 may be in any form factor, e.g., M.2 module. The wireless device 120 includes connectors (not shown) for connection to the plurality of antennas 130. The wireless device 120 may be configured to transmit and receive under any wireless communication protocols including IEEE 802.11-based Wi-Fi protocols, cellular-based protocols (e.g., 3G, 4G, 5G, etc.), Bluetooth, or the like.

At least one of the processor 112 or the processor 122 may be configured to determine the characteristics of a platform noise received at the wireless device 120 due to utilization of circuitries and processing components on the platform 110 and implement a measure to mitigate the platform noise based on the determined characteristics of the platform noise. The characteristics of the platform noise may be magnitude or amplitude and frequency and bandwidth of the noise, dynamic and static nature of the noise, frequency selective characteristics of the noise, etc. The determination of the characteristics of the platform noise and/or the implementation of the measure to mitigate the platform noise may be performed in real-time. The determination of the characteristics of the platform noise and the implementation of the measure may be based on the applications and/or workload on the platform. Different applications may have different noise characteristics. For example, a video streaming application has noise characteristics that is different from a gaming application, etc. In examples disclosed herein, an adaptive real-time and/or application/context-aware noise/interference mitigation measure is implemented to mitigate the platform noise based on the determined characteristics of the platform noise.

In some examples, the processor 112 may be configured to monitor the utilization of the circuitries and processing components on the platform 110 and estimate the characteristics of the platform noise to be incurred at the wireless device 120 based on the monitored utilization of the circuitries/components on the platform 110. The processor 112 may determine a noise covariance matrix based on the estimated characteristics of the platform noise and send one of the noise covariance matrix, an eigen vector having a smallest eigen value of the noise covariance matrix, or an information related to the noise covariance matrix or the eigen vector to the wireless device 120. Noise covariance matrices or corresponding eigen vectors may be pre-determined and stored in an LUT(s) and may be selected from the LUT. The processor 122 may then apply the eigen vector to samples received on the plurality of antennas in time domain. The received samples are spatially projected toward the smallest noise power in time domain. The spatial projection of the received signal explained above is one specific way of time-domain whitening. In general, any time domain whitening processing may be performed based on the noise information, e.g., applying the inverse noise covariance matrix to the received samples in time domain.

In some examples, the processor 122 (which can be application specific integrated circuit (ASIC), field programmable gate array (FPGA), etc.) may apply a noise whitening matrix obtained from the noise covariance matrix (i.e., inverse of the noise covariance matrix) to the received samples in a frequency domain.

In some examples, the processor 122 may measure a noise power on each antenna and apply a scaling factor to a received signal on each antenna based on the noise power measured on the antennas. Alternatively, the processor 122 may receive the measurement or the scaling factor from the platform 110 and apply the scaling factor to the received signal.

In some examples, the processor 122 may measure the characteristics of the noise on the antennas, determine a noise covariance matrix based on the measured characteristics of the noise, and apply an eigen vector of the noise covariance matrix having a smallest eigen value to samples received on the plurality of antennas in time domain. The processor 122 may apply any time domain whitening processing based on the noise covariance information, e.g., applying the inverse noise covariance matrix to the received signal in time domain. In this example, the wireless device 120 may implement the measure without input from the platform 110. The processor 122 may also apply a noise whitening matrix obtained from the noise covariance matrix in a frequency domain.

In some examples, the processor 112 may determine the characteristics of the platform noise based on the utilization of the circuitries and processing components on the platform 110 and/or the application/context or the workload on the platform 110, generate a spectral mask based on the determined characteristics of the platform noise, which may change based on the workload and applications on the platform, and send different spectral masks to the wireless device 120 at different times. The processor 122 may then apply the spectral mask to received samples on the plurality of antennas to scale an amplitude of the received samples in a frequency domain.

Figure 8:
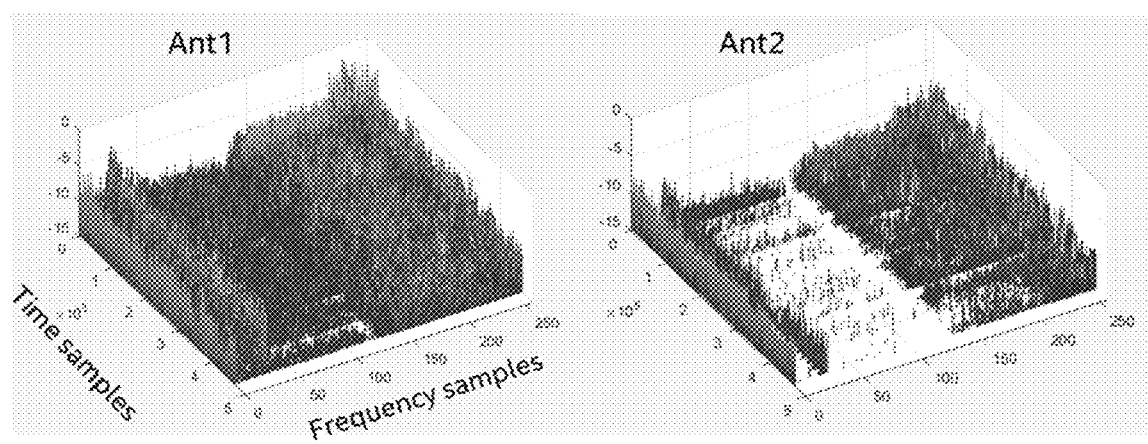
FIG. 8 shows an example platform noise measurement on two antennas while running YouTube.

The information regarding the platform noise may be passed from the platform 110 to the wireless device 120 and the wireless device 120 may perform noise mitigation based on the received information. The noise information may be sent periodically. The period for sending the information may depend on the application running on the platform 110. FIG. 8 shows an example platform noise measurement on two antennas while running YouTube. The simulation is done for the noise measurement on a platform operating at 20 MHz channel on 2.4 GHz when YouTube application was running. The information may be the worst case, the average, etc.

The platform 110 may monitor indicators, counters, and/or statistics that reflect the utilization of circuitries and components on the platform 110 (such as a memory, a PCIe bus, a GPU, etc.) and determine the characteristics of the platform noise in real-time (e.g., using a trained model). The characteristics of the platform noise may be measured or determined through prior measurements, simulations, etc. and saved, for example in a look-up table(s), and the platform may determine the characteristics of the platform noise based on the monitored activities of the platform 110 using a look-up table(s)). The platform 110 then sends information regarding the platform noise to the wireless device 120 (e.g., the wireless device driver/firmware) for real-time processing for noise mitigation at the wireless device 120.

In one example, the platform 110 may determine the spatial noise covariance matrix $R_{Noise}$ based on the estimated platform noise and send information for time domain (TD) spatial projection to the wireless device 120. The wireless device 120 may then perform TD spatial projection on the signals received on the antennas 130. The TD spatial projection would improve packet acquisition by the wireless device 120. The target scenario is a wideband, spatially correlated platform noise across the antennas. With this scheme, the wireless device 120 can project the received I/Q samples spatially in the direction of minimum noise power.

The received signal via a plurality of antennas 130 at the wireless device 120 can be written as:

$$y=hx+n, \qquad \text{Equation (1)}$$

where x is a transmitted signal, y is a received signal at the wireless device, h is a channel coefficient, and n is a noise.

The platform 110 (the processor 112 in the platform 110) may determine the noise covariance matrix based on the estimated platform noise and perform eigen value decomposition (or SVD) to obtain eigen vectors as follows:

$$Cov(n)=R_{Noise}, \qquad \text{Equation (2)}$$

$$SVD:R_{Noise}=U\Sigma V, V=[v_1 v_2]. \qquad \text{Equation (3)}$$

The eigen vector having the smallest eigen value ($v_2$ in this example) may be selected as a spatial projection vector: $p=v_2$. This projection vector (p) may be provided by the platform 110 to the wireless device 120. Alternatively, the platform 120 provides the noise covariance matrix to the wireless device 120 and the wireless device 120 (the processor 122 in the wireless device 120) performs the eigen-value decomposition or SVD to obtain the eigen vectors. The wireless device 120 may then perform the TD spatial projection using the projection vector p as follows:

$$\tilde{y}_{1\times 1}=p^H y=p_1 y_1+p_2 y_2, \qquad \text{Equation (4)}$$

where $y_1$ and $y_2$ are the received samples on antennas 1 and 2, respectively, and $p=\{p_1, p_2\}$.

It should be noted that some examples are explained with reference to the case of two antennas, but the examples are applicable to a system having any number of antennas (e.g., 4 or more antennas).

Optionally, spatial whitening may also be performed in a frequency domain (FD). The TD whitening may improve acquisition, and the FD whitening may improve data decoding. For the FD whitening, the whitening matrix: $W=R_{Noise}^{-1/2}$ may be generated by the platform 110 based on the noise covariance matrix and provided to the wireless device 120. The wireless device 120 may then perform a FD whitening as:

$$\tilde{y}_{2\times 1}=Wy. \qquad \text{Equation (5)}$$

The platform 110 and/or the wireless device 120 may include a LUT(s) for storing the noise covariance matrixes, the eigen vectors, and/or the whitening matrixes, and select an entry from the LUT(s). For example, instead of sending the projection vector (or the noise covariance matrix) to the wireless device 120, the platform 110 may send an index to an LUT for the projection vector (or the noise covariance matrix).

In certain platforms, the platform noise may be observed only in certain channels or frequency bands at the same or different levels and/or may change based on the workload. Therefore, different LUTs may be stored for each channel or frequency band, and depending on the operating channel or scanning channel, the relevant data may be retrieved from the LUT(s) (e.g., by the Wi-Fi driver).

There may be a case of frequency-selective noise characteristics. In this case, the platform noise level may change per orthogonal frequency division multiplex (OFDM) subcarrier or per group of OFDM subcarriers. In this case, the N×N noise covariance matrix ($R_{Noise}$), the projection vector (p) and the FD whitening matrix may be defined for each subcarrier or group of subcarriers.

The below SNR derivation explains how the expected gain is achievable.

$$y_1=H_1 PF^H x+n_1, \qquad \text{Equation (6)}$$

$$y_2=H_2 PF^H x+n_2, \qquad \text{Equation (7)}$$

where $y_1$, $y_2$, which is a vector $\in C^{(N+Ncp+L-1)\times 1}$, are received signals, $F^H$ is an N-point fast Fourier transform (FFT) matrix, P is a cyclic prefix matrix, and H is a Toeplitz matrix channel matrix, and $n_1$, $n_2$ are noise.

Let $s_1=H_1 CF^H x$ and $s_2=H_2 CF^H x$, $S=[s_1\ s_2]$, and $N=[n_1\ n_2]$.

$$Y=S+N, \qquad \text{Equation (8)}$$

where Y is a matrix $\in C^{(N+Ncp+L-1)\times 2}$. $y(n)=s(n)+n(n)$ where $y(n)$ is a vector $\in C^{1\times 2}$ and v is a projection vector $\in C^{2\times 1}$ $$v^H y(n)^T = v^H s^T + v^H n^T, \qquad \text{Equation (9)}$$

$$SNR = \frac{E\{|v^H s^T|^2\}}{E\{|v^H n^T|^2\}} = \frac{v^H s^T s^* v}{v^H R_n v}. \qquad \text{Equation (10)}$$

Using the eigen value/vector property: $Ax_m = \lambda_n x_m$, $$SNR = \frac{v^H s^T s^* v}{\lambda v^H v} = \frac{v^H s^T s^* v}{\lambda} \quad \text{Equation (11)}$$

$$R_n = \begin{bmatrix} \vdots & \vdots & & \vdots \\ a_1 & a_2 & \cdots & a_m \\ \vdots & \vdots & & \vdots \end{bmatrix} = U \sum V^T = \quad \text{Equation (12)}$$

$$\begin{bmatrix} \vdots & \vdots & & \vdots \\ u_1 & u_2 & \cdots & u_m \\ \vdots & \vdots & & \vdots \end{bmatrix} \begin{bmatrix} \lambda_1 & & & \\ & \lambda_2 & & \\ & & \ddots & \\ & & & \lambda_m \end{bmatrix} [v_1 \; v_2 \; \cdots \; v_m].$$

Figure 2:
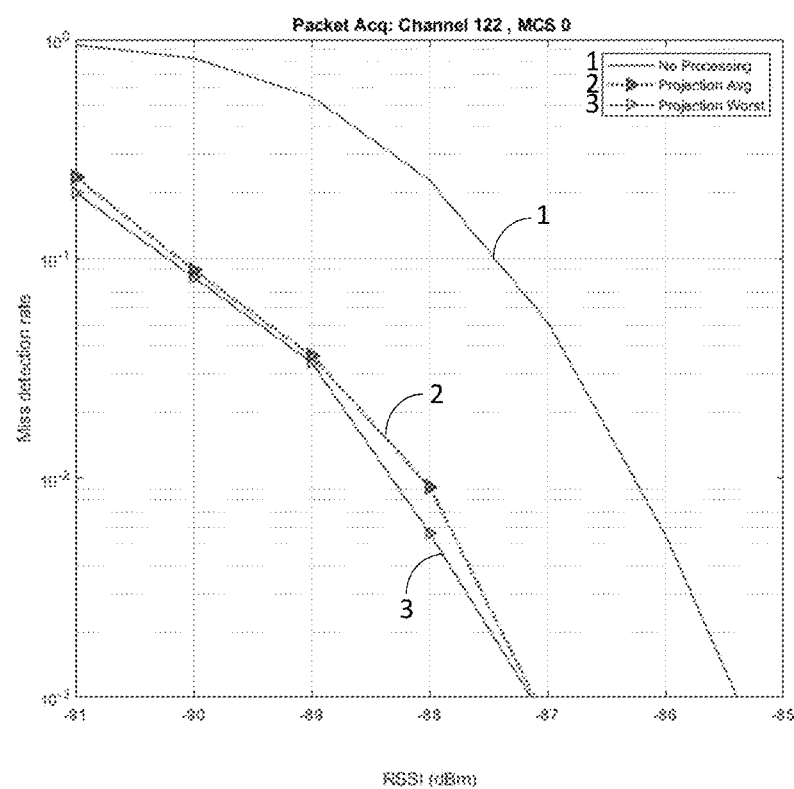
FIGS. 2 and 3 are simulation results for the example that the platform provides the information for time domain (TI)) spatial projection at the wireless device based on the platform noise characteristics.
Figure 3:
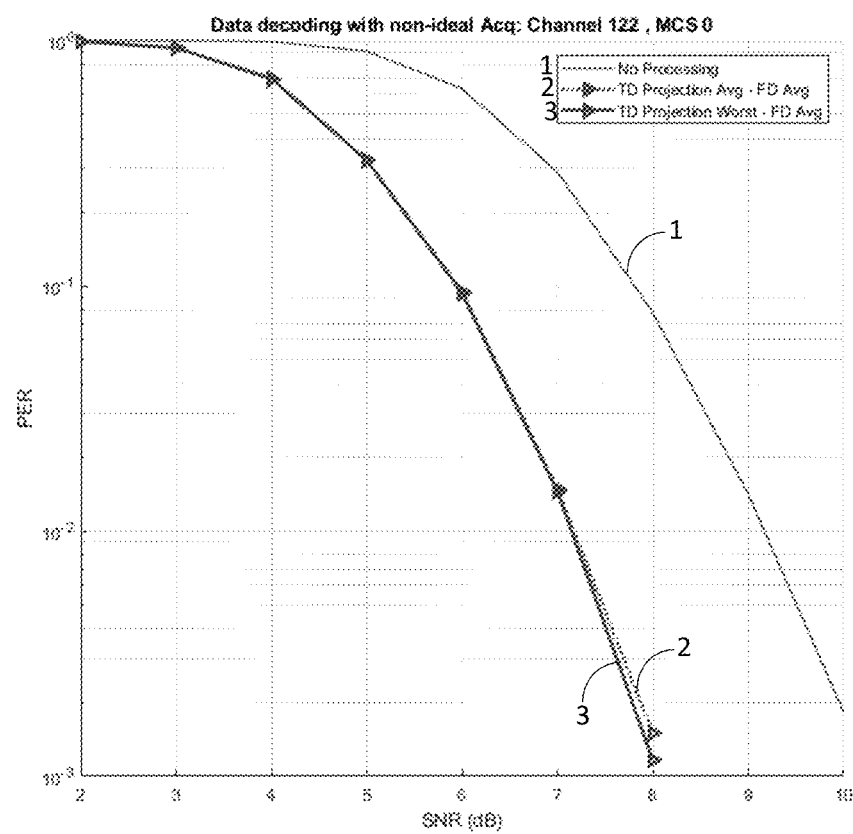

The SNR gain is obtained when the projection vector v is the eigenvector of the noise covariance matrix ($R_n$) that is associated with the minimum eigenvalue. Therefore, similar to the Principal Component Analysis, an SNR gain is achieved as the smallest $\lambda$ is chosen. FIGS. 2 and 3 are simulation results showing close to 3 dB gain in acquisition when an average noise covariance matrix from the 25 second measurement (curve 2) or the worst covariance matrix among the 25 measurements (each averaged over 1 second) is inserted into the simulation (curve 3). The received signal strength indicator (RSSI) values in the x-axis in FIG. 2 are to reflect the relative delta between curves and may not be accurate as the lab measurements were not calibrated to the exact values.

The time-domain projection may be followed by the frequency domain whitening $W_y$ to further improve the performance (e.g., a PER). FIG. 3 shows the packet error rate (PER) corresponding to FIG. 2 after frequency domain whitening. The SNR reflects relative performance and is not calibrated with a baseline.

Figure 4:
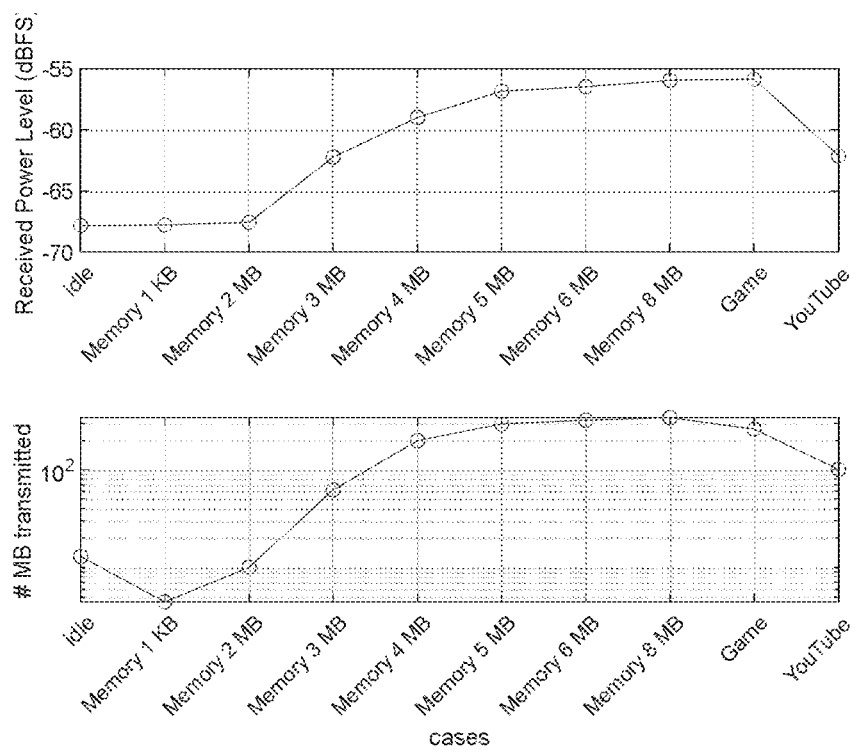
FIG. 4 shows correlation between the measured platform noise level and the data from the platform memory indicator.

The platform noise level may vary with the utilization of the circuitries and components on the platform 110, for example the memory. FIG. 4 shows correlation between the measured platform noise level and the data from the platform memory indicator. The platform may monitor the utilization of the circuitries and components on the platform and may determine the platform noise characteristics based on the workload/utilization of the platform components/circuitries. The data in the LUT may be a function of the workload.

In accordance with another example, antenna power scaling may be performed based on the measured noise. The wireless device 120 may measure the noise power on each of the plurality of antennas 130 and then set antenna gains for the antennas based on the measured noise power. The wireless device 120 may obtain such information from the platform 110 through pre-stored LUT or real-time machine learning-based noise prediction. This scheme may be implemented through a simple antenna gain setting. The antenna gain setting may consider the fact that one antenna picks a higher noise level and hence a smaller gain may be applied to that RF chain.

In one example, the antenna gain may be set according to the measured noise power level of each antenna as follows:

$$y_A = N_A \cdot y/(N_A + N_B), \quad \text{Equation (13)}$$

$$y_B = N_B \cdot y/(N_A + N_B), \quad \text{Equation (14)}$$

where $N_A$ and $N_B$ are the noise power measured at antenna A and B, respectively. This example can be extended straightforwardly to the case of more than two antennas.

Figure 5:
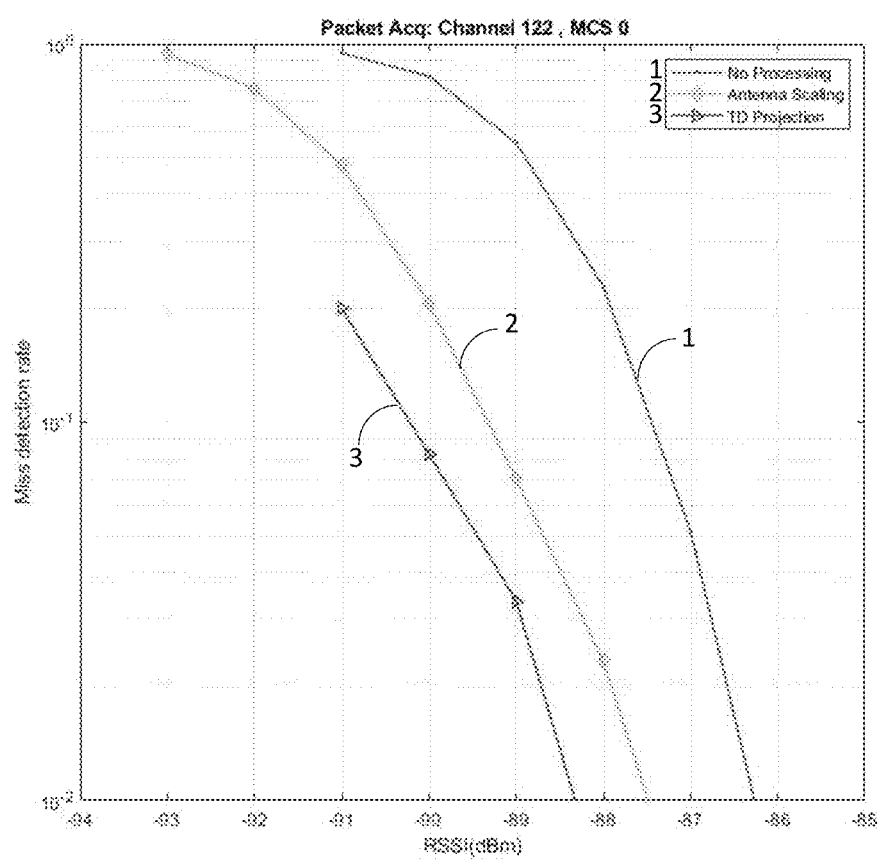
FIG. 5 shows the results of simulation for the example that the wireless device sets antenna gain based on the measured platform noise.

FIG. 5 shows the results of simulation. FIG. 5 shows that the antenna power scaling in accordance with this example provides close to 2 dB gain in acquisition.

In accordance with another example, the noise estimation and generation of the eigen vector for TD projection may be performed by the wireless device 120. In case of Wi-Fi, in one example, the wireless device 120 (Wi-Fi device) may use the legacy long training field (L-LTF) (and its duplication across the entire bandwidth) of the physical layer protocol data unit (PPDU) in measuring the noise on each of the antennas. A PPDU includes a preamble and a data field. The preamble includes a short training field (STF), a long training field (LTF), and a signal field (SIG). The STF is for coarse synchronization and the LTF is for fine synchronization and channel estimation. The LTF may be used for noise measurements as explained below.

The wireless device 120 may use the preamble of the PPDU to estimate second order statistic regarding the platform noise. The wireless device 120 may then obtain the noise covariance matrix similar to the example disclosed above and perform eigen/singular value decomposition on the noise covariance matrix to identify the smallest eigen vector for the TD projection.

The L-LTF includes two OFDM symbols (two identical long training symbols). The wireless device 120 may receive two long training symbols in the L-LTF and subtract one from the other in the frequency domain. Since the Wi-Fi channel within the duration of the L-LTF which is 3.2 μs can be assumed to be invariant, the channel effect can be canceled with such subtraction.

For the L-LFT, the received samples of the two long training symbols at subcarrier k can be written as:

$$y_{LTF_1,k} = h_{k,1} x_{k,1} + n_{k,1}, \quad \text{Equation (15)}$$

$$y_{LTF_2,k} = h_{k,2} x_{k,2} + n_{k,2}. \quad \text{Equation (16)}$$

Figure 6:
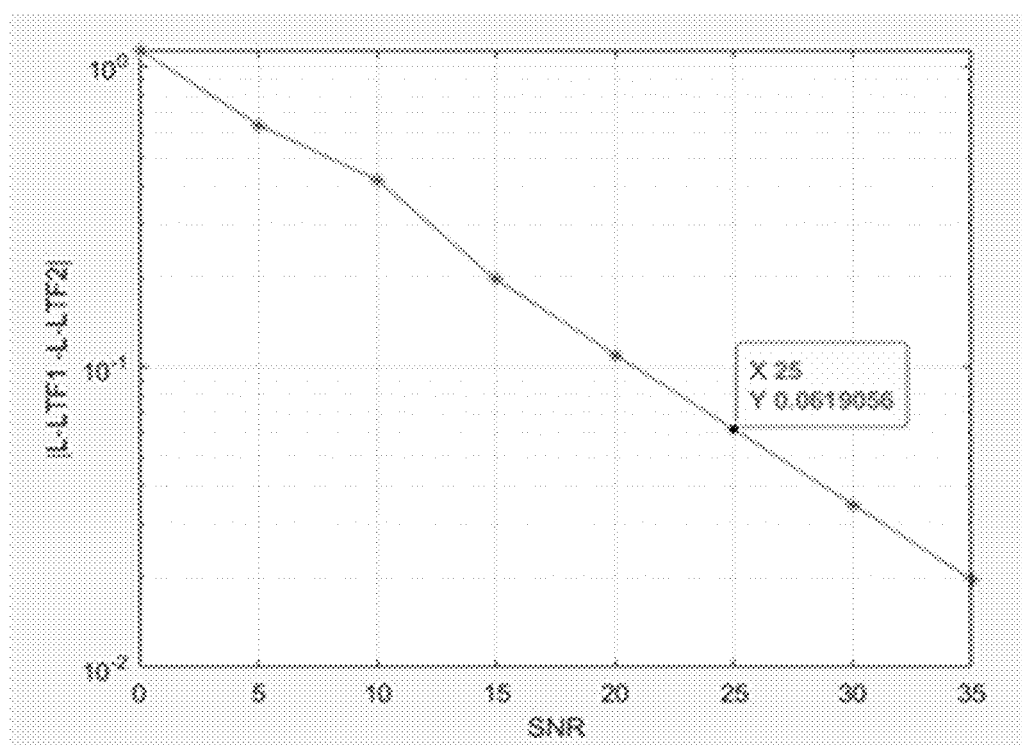
FIG. 6 shows the relation between the subtraction of the two long training fields and the signal-to-noise ratio (SNR)

FIG. 6 shows the relation between the |L-LTF_1-L-LTF_2| vs. SNR. As shown in FIG. 6, subtracting the two long training symbols in the L-LTF can infer information about the noise variance. Hence, the two long training symbols of the L-LTF are subtracted to estimate the noise covariance matrix. Frequency domain subtraction of the two OFDM symbols (long training symbols of the L-LTF) is:

$$y_{LTF_1} - y_{LTF_2}. \quad \text{Equation (17)}$$

Such operation can be considered as a subtraction of two random variable at time 1 and 2: $N_1 - N_2$, where $N \in C^{N_f \times 2}$, $N_f$ is the number of subcarriers. To find the covariance matrix:

$$R = (N_1 - N_2)^H (N_1 - N_2), \quad \text{Equation (18)}$$

$$R = R_1 + R_2 - (R_{12} + R_{21}). \quad \text{Equation (19)}$$

where $R_1$, $R_2$ are the covariance matrix at time 1 and 2, respectively.

It can be shown that the time domain and frequency domain covariance matrix are equivalent. Let frequency domain noise samples as Fn, where $(F^H F) = I$.

A covariance matrix may be written as:

$$R_n = \begin{bmatrix} (Fn_1)^H \\ (Fn_2)^H \end{bmatrix} \times [Fn_1 \; Fn_2] = \begin{bmatrix} n_1^H n_1 & n_1^H n_2 \\ n_2^H n_1 & n_2^H n_2 \end{bmatrix}. \quad \text{Equation (20)}$$

It can be observed that the time covariance matrix is equivalent to the frequency domain covariance matrix. Therefore, the time domain projection vector and the frequency domain weighting matrix can be estimated from the same estimated noise covariance matrix $R_n$.

Figure 7A:
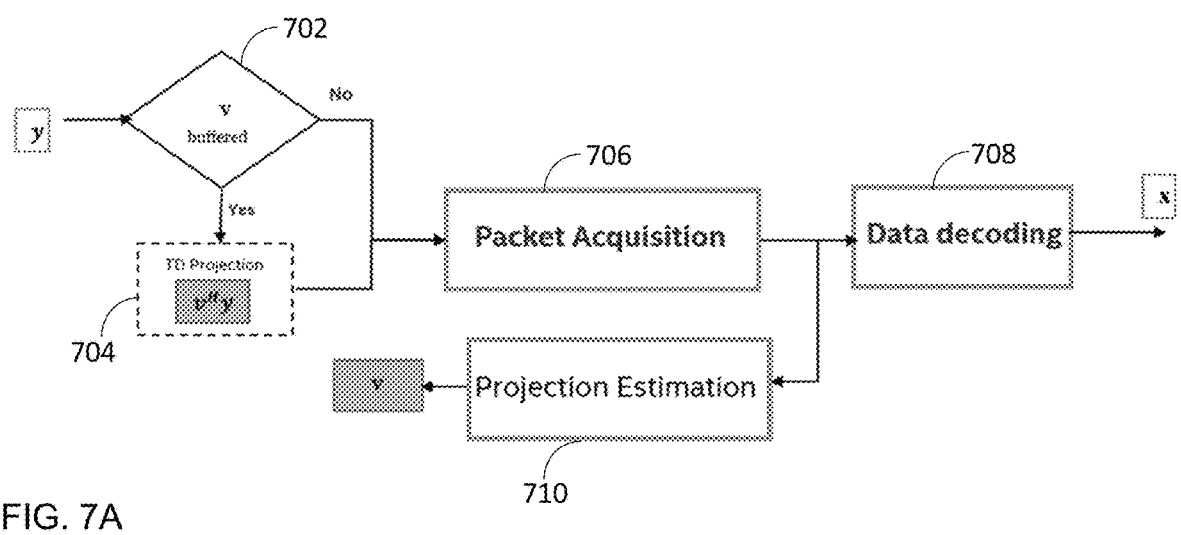
FIG. 7A shows an example process for the TI) spatial projection using the eigen vector of the noise covariance matrix.

In implementation, the noise covariance matrix and the TD projection vector are obtained from the incoming packets (e.g., PPDU). Therefore, feedback is needed for the estimate from one packet to the next. FIG. 7A shows an example process for the TD spatial projection using the eigen vector of the noise covariance matrix. When a new packet (e.g., a Wi-Fi PPDU) is received, it is determined whether the eigen vector v (i.e., the spatial projection vector) has been generated and stored (702). If so, the TD projection is performed with the stored eigen vector (704). After the TD projection is performed on the received samples, a packet is acquired (706) and then decoded (708).

If the eigen vector v has not been stored, the packet is acquired without TD projection (706) and projection estimation processing is performed on the acquired packet to estimate the noise covariance matrix and to obtain the eigen vector v for TD projection (710). The eigen vector is then stored for the next packet.

The initial eigen vector v may be provided by the platform 110 to the wireless device 120. The eigen vector v may be modified in runtime based on the information sent from the platform 110. For example, a long-term noise data may be used to filter out the fast transient estimation.

Figure 7B:
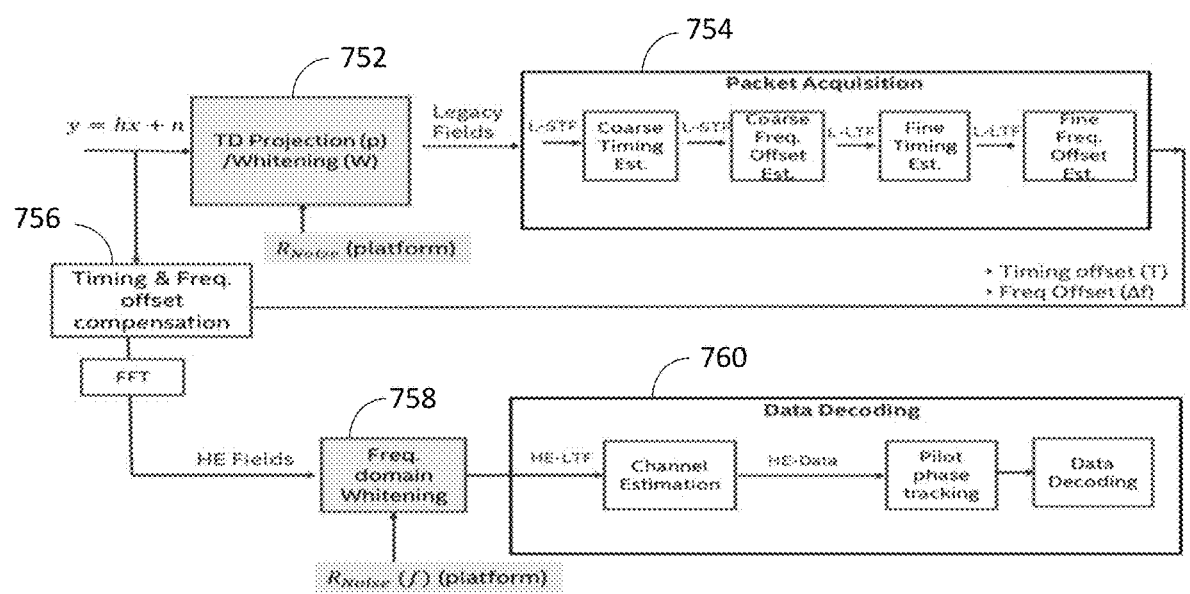
FIG. 7B shows an example of time domain whitening and frequency domain whitening processing based on the obtained platform noise information.

FIG. 7B shows an example of time domain whitening and frequency domain whitening processing based on the obtained platform noise information. The wireless device receives or obtains a noise covariance matrix and applies the TD projection or whitening to the received signal as explained above (752). After the time domain TD projection or whitening, coarse timing estimation and coarse frequency offset estimation using a short training field (STF) and fine timing estimation and fine frequency offset estimation using a long training field (LTF) (754). Timing and frequency offset compensation is performed based on the estimated timing offset and frequency offset (756). After FFT processing on the received samples, frequency domain whitening may be performed using a noise whitening matrix obtained from the noise covariance matrix in a frequency domain (758). Data decoding processing including channel estimation is then performed (760).

Figure 9:
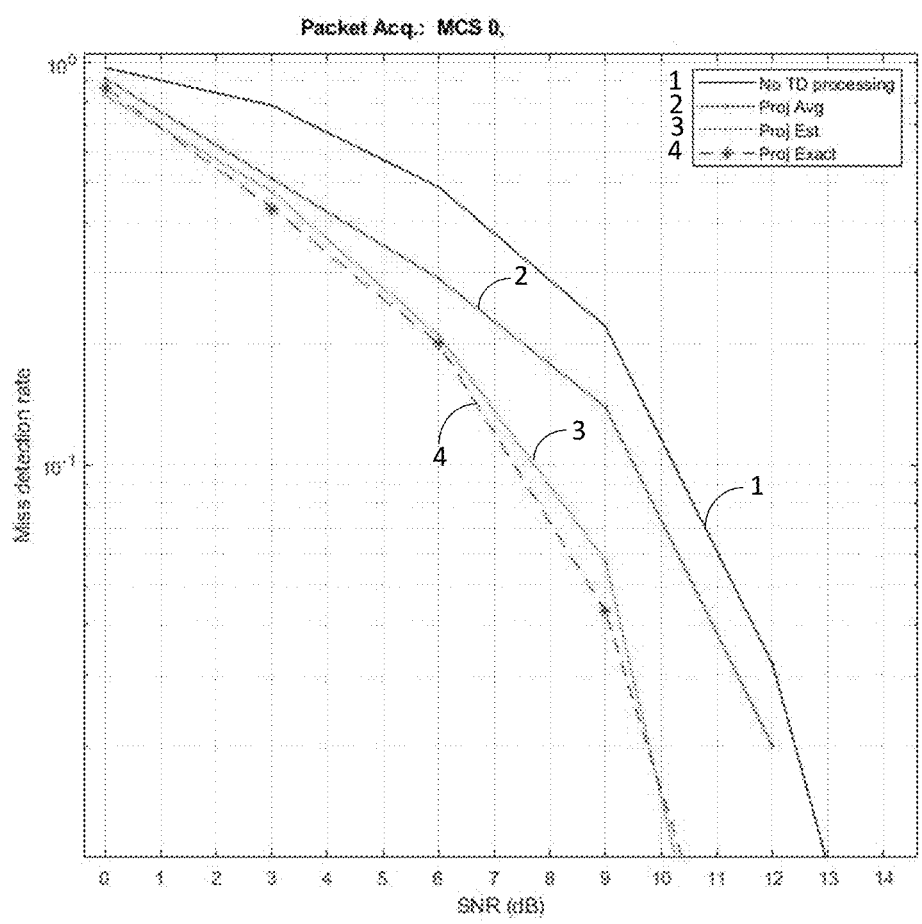
FIG. 9 shows simulation results for packet acquisition using the noise estimation and mitigation by the wireless device in accordance with the above example.

FIG. 9 shows simulation results for packet acquisition using the noise estimation and mitigation by the wireless device 120 in accordance with the above example. The miss-detection rate shows that the noise estimation and calculation of noise covariance matrix by the wireless device 120 and obtaining and application of the projection vector by the wireless device 120 (curve 3) results a performance improvement similar to utilizing exact per packet noise information from platform (curve 4) based on the first example disclosed above. It also performs better than the first example with long-term averaging of noise covariance matrix (curve 2).

In another example, ML-based spectral analysis may be used in mitigating the platform noise. In this example, a "spectral mask" is determined from the characterization of the platform noise under different platform usage or workload scenarios. A series of comprehensive trainings may be done pre-production for each platform make/model. Using a noise estimation tool, the noise characteristics may be predicted during run-time. The platform activities may be correlated with the noise characteristics. During the runtime, depending on the user context and utilization of platform components, a noise spectral mask may be predicted by the platform 110 and passed to the wireless device 120. A "spectral mask" is a set of coefficients used to scale each of the spectral components in the received signal. The wireless device 120 may apply the spectral mask to every received packet (e.g., a PPDU) subcarrier by subcarrier or a group of subcarriers to improve reception performance.

Figure 10:
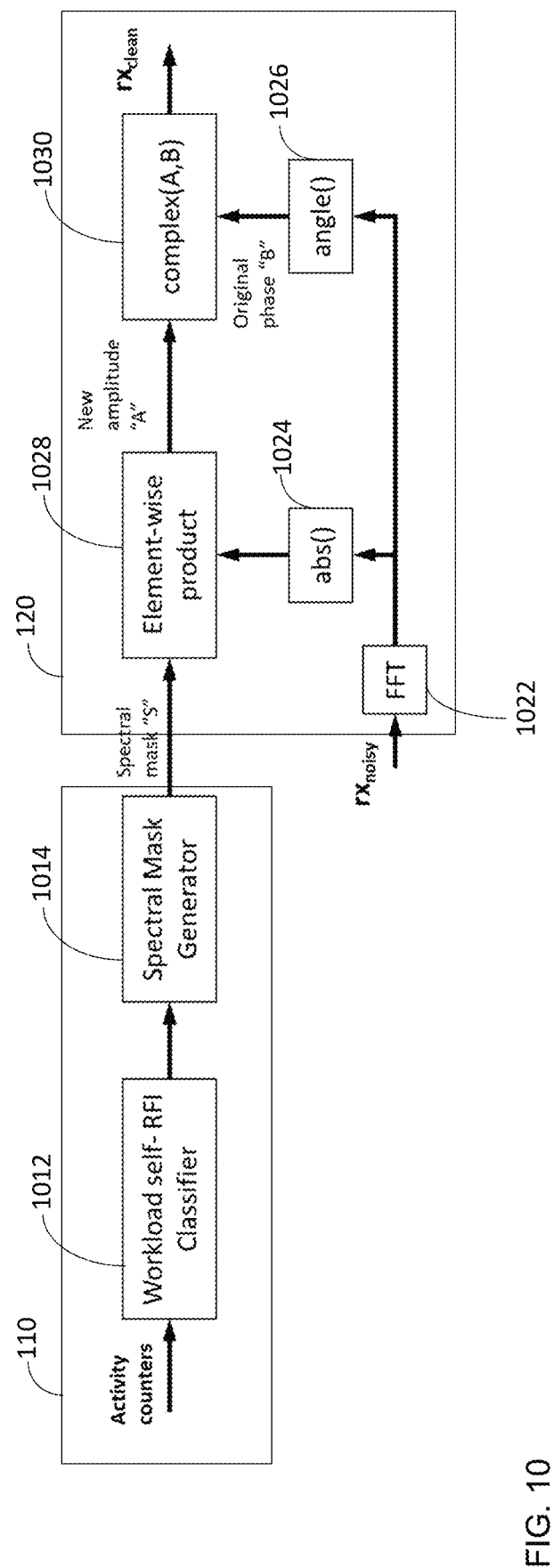
FIG. 10 is a block diagram of an example system for applying a spectral mask based on platform activities.

FIG. 10 is a block diagram of an example system for applying a spectral mask based on platform activities. The platform 110 monitors the activities on the platform 110. The platform 110 may monitor the indicators, counters, and statistics that reflect the utilization of different circuitries and components of the platform 110, such as memory, PCIe bus, processor, etc. The workload self-RFI classifier 1012 generates a classification based on the platform activity counter/indicator. The classifier is a label that uniquely identifies one of many platform usage scenarios. Each scenario is characterized by the kind of interference that it generates. Based on this classification, a spectral mask is generated suitable for canceling the interference.

The spectral mask generator 1014 determines or selects a spectral mask based on the classification and sends the spectral mask to the wireless device 120.

The wireless device 120 receives a signal ($rx_{noisy}$) via a plurality of antennas 130. The platform noise is captured by the antennas and may degrade the reception processing of the received signal. In this example, the amplitude of the received signal is scaled by the spectral mask while the phase of the received signal is preserved. The FFT unit 1022 transforms the received signal to a frequency domain. The amplitude component is extracted by the amplitude processing unit 1024 and multiplied with the spectral mask in frequency domain by the element-wise multiplier 1028. The output of the element-wise multiplier 1028 is an adjusted amplitude of the received signal in frequency domain.

After application of the spectral mask, a recovered signal is generated by the complex processing unit 1030 from the masked amplitude and the original received phase. The original phase information of the received signal is extracted by the angle processing unit 1026 and the original phase is combined by the complex processing unit 1030 with the adjusted amplitude of the received signal to generate a recovered signal with noise cancelled/reduced.

Figure 11:
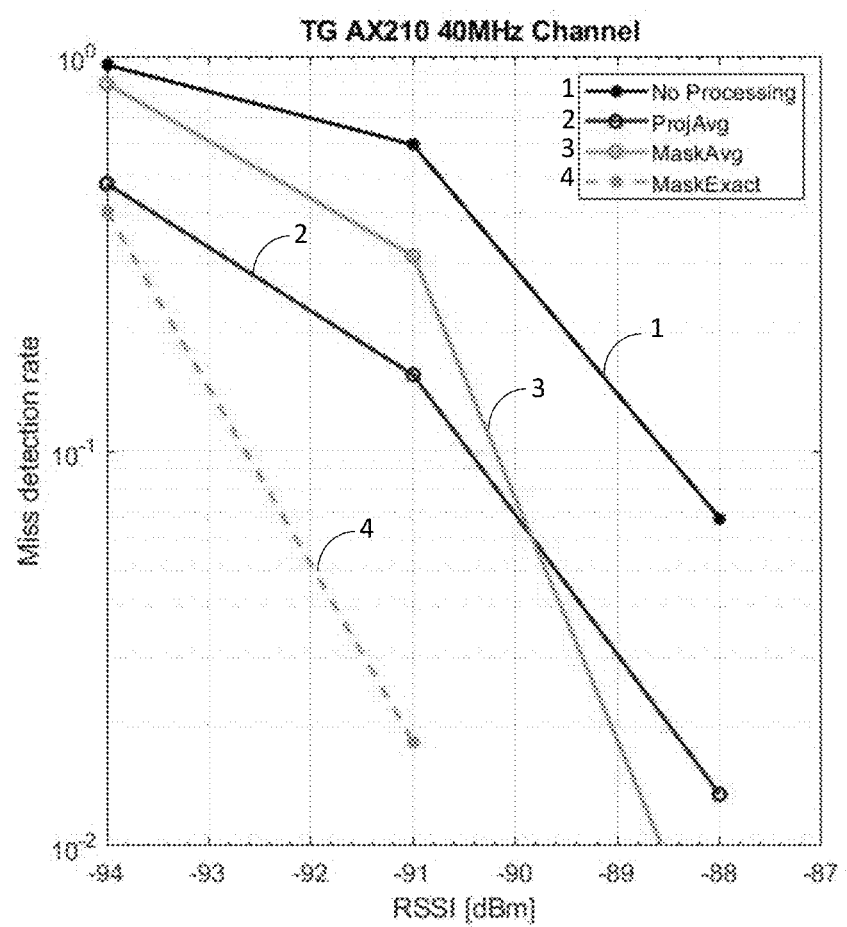
FIG. 11 shows simulation results to evaluate the performance of this example and to compare it with the first example disclosed above.

FIG. 11 shows simulation results to evaluate the performance of this example and to compare it with the first example disclosed above. This method provides close to 2 dB gain in acquisition. The simulation includes two cases (a) sending the average of spectral mask predicted/measured over a period (25 second in a typical measurement/training duration) (curve 3) and for (b) the exact mask per packet (curve 4). Although (b) is not practical for the implementation as the host cannot send the updated and predicted mask per packet to the wireless device, the platform can provide a bound for the best-case performance for this noise/platform. As it can be seen, the performance of this example method is similar to the projection method of the first example.

Figure 12:
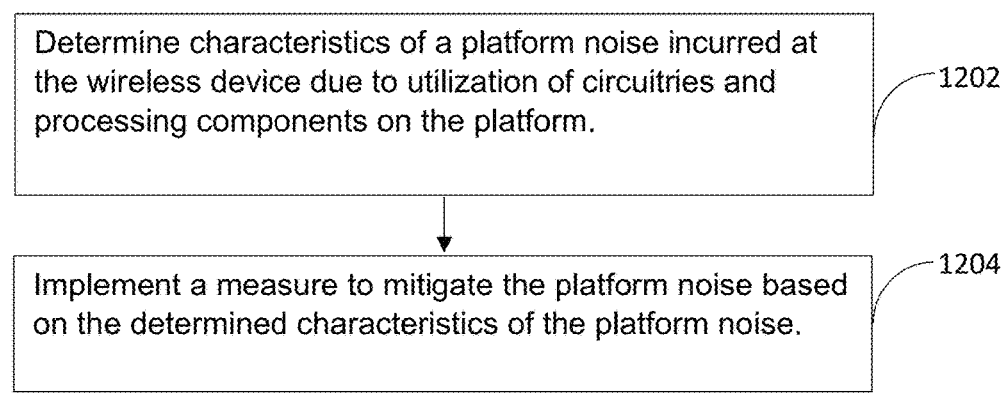
FIG. 12 is a flow diagram of an example method for mitigating a platform noise.

FIG. 12 is a flow diagram of an example method for mitigating a platform noise. The method includes determining characteristics of a platform noise incurred at the wireless device due to utilization of circuitries and processing components on the platform (1202). The method includes implementing a measure to mitigate the platform noise based on the determined characteristics of the platform noise (1204).

The determination of the characteristics of the platform noise and/or the implementation of the measure includes one of (i) receiving information, from the platform, including one of a noise covariance matrix of platform noise incurred at the wireless device due to utilization of circuitries and processing components on the platform, an eigen vector having a smallest eigen value of the noise covariance matrix, or an information related to the noise covariance matrix or the eigen vector, or the information related to the noise power at each antenna and applying the eigen vector to samples received on the plurality of antennas in time domain; (ii) measuring a noise power on each antenna and applying a scaling factor to a received signal on each antenna based on the noise power measured on each antenna; (iii) measuring a noise on the antennas, estimating the noise at each RF chain, determining a noise covariance matrix, and applying an eigen vector of the noise covariance matrix having a smallest eigen value to samples received on the plurality of antennas in time domain; or (iv) receiving a spectral mask from the platform and applying the spectral mask to received samples on a plurality of antennas to scale an amplitude of the received samples in a frequency domain, wherein the spectral mask is generated by the platform based on utilization of circuitries and processing components on the platform.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

Figure 13:
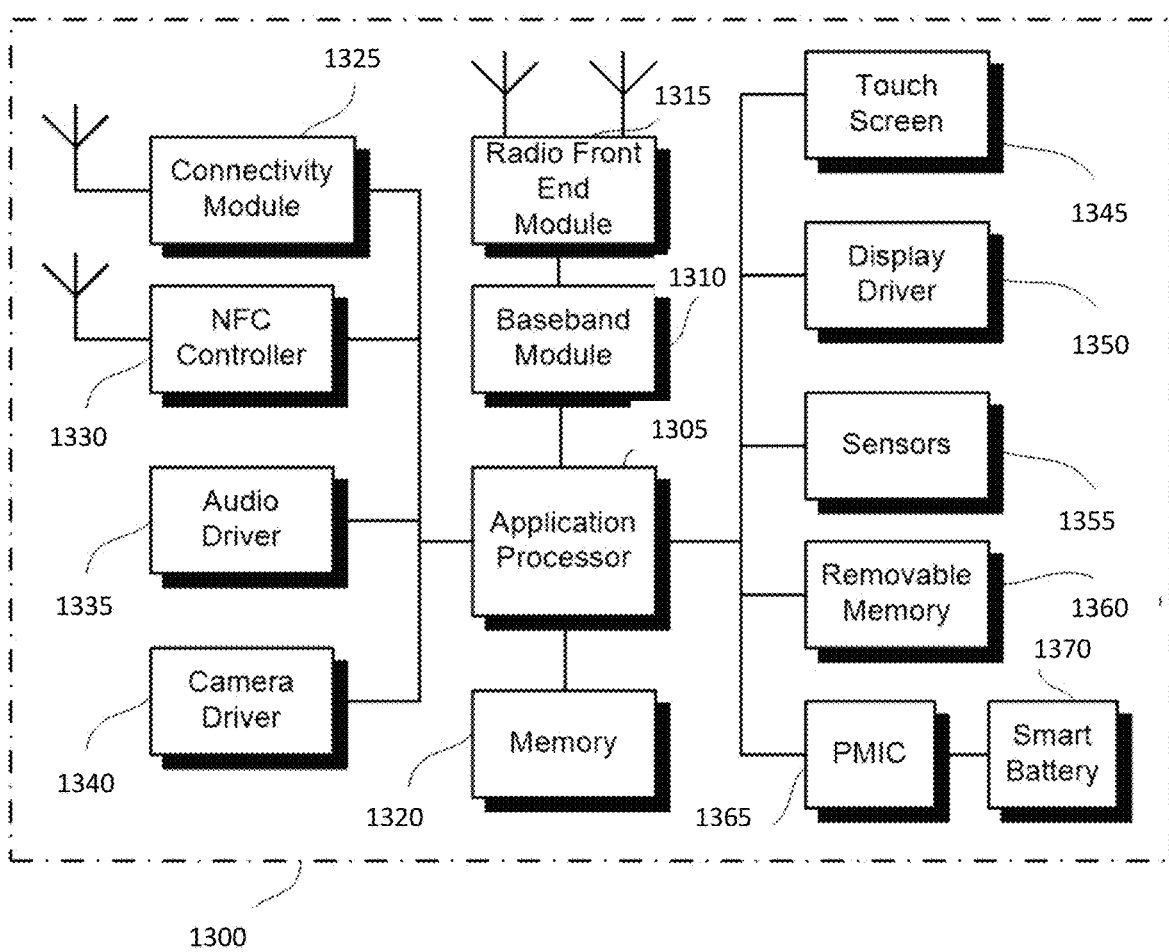
FIG. 13 illustrates a user device in which the examples disclosed herein may be implemented.

FIG. 13 illustrates a user device 1300 in which the examples disclosed herein may be implemented. For example, the examples disclosed herein may be implemented in the radio front-end module 1315, in the baseband module 1310, etc. The user device 1300 may be a mobile device in some aspects and includes an application processor 1305, baseband processor 1310 (also referred to as a baseband module), radio front end module (RFEM) 1315, memory 1320, connectivity module 1325, near field communication (NFC) controller 1330, audio driver 1335, camera driver 1340, touch screen 1345, display driver 1350, sensors 1355, removable memory 1360, power management integrated circuit (PMIC) 1365 and smart battery 1370.

In some aspects, application processor 1305 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 1310 may be implemented, for example, as a solder-down substrate including one or more integrated circuits, a single packaged integrated circuit soldered to a main circuit board, and/or a multi-chip module containing two or more integrated circuits.

Figure 14:
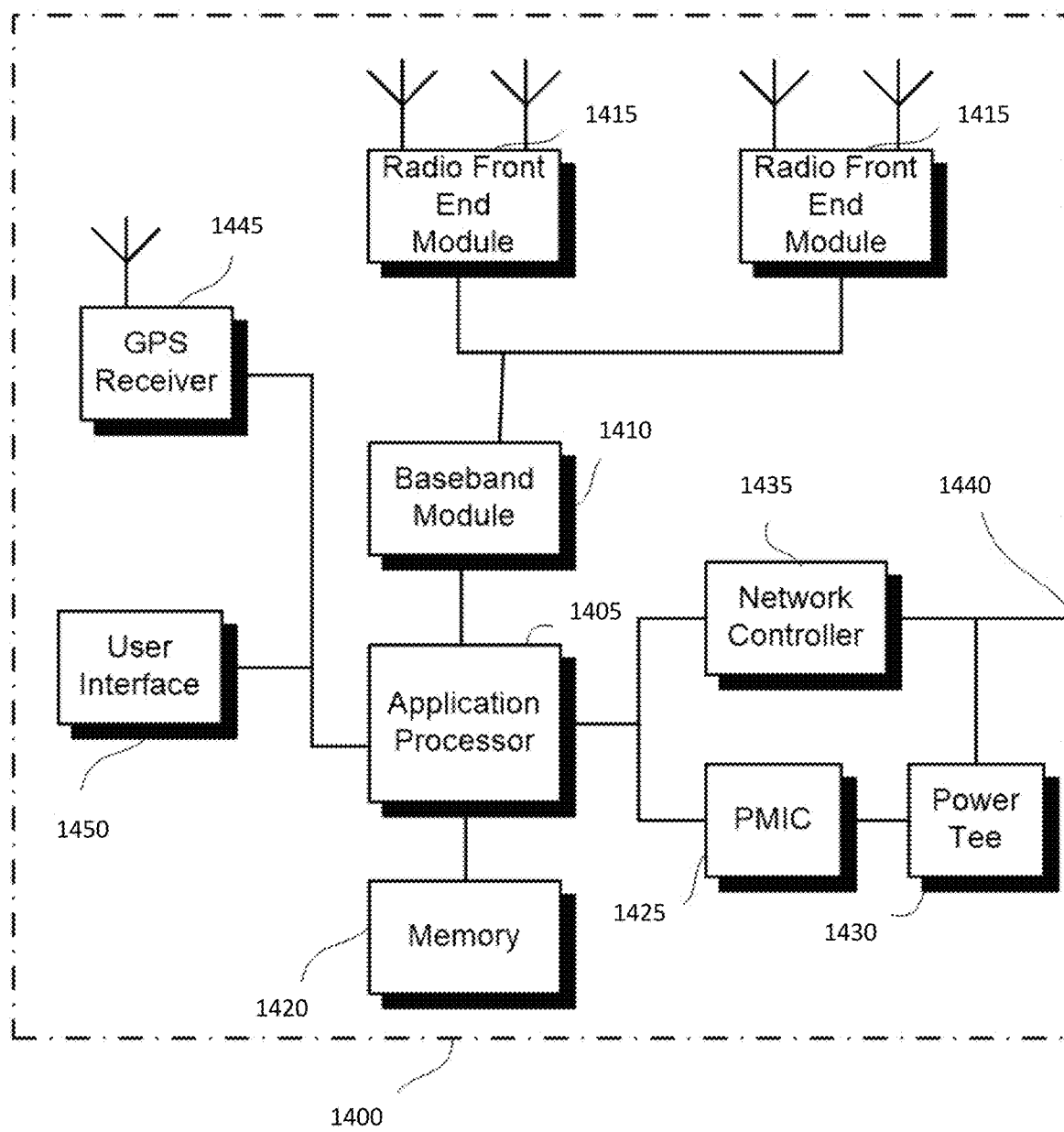
FIG. 14 illustrates a base station or infrastructure equipment radio head in which the examples disclosed herein may be implemented.

FIG. 14 illustrates a base station or infrastructure equipment radio head 1400 in which the examples disclosed herein may be implemented. For example, the examples disclosed herein may be implemented in the radio front-end module 1415, in the baseband module 1410, etc. The base station radio head 1400 may include one or more of application processor 1405, baseband modules 1410, one or more radio front end modules 1415, memory 1420, power management circuitry 1425, power tee circuitry 1430, network controller 1435, network interface connector 1440, satellite navigation receiver module 1445, and user interface 1450.

In some aspects, application processor 1405 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 1410 may be implemented, for example, as a solder-down substrate including one or more integrated circuits, a single packaged integrated circuit soldered to a main circuit board or a multi-chip module containing two or more integrated circuits.

In some aspects, memory 1420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 1420 may be implemented as one or more of solder down packaged integrated circuits, socketed memory modules and plug-in memory cards.

In some aspects, power management integrated circuitry 1425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 1430 may provide for electrical power drawn from a network cable to provide both power supply and data connectivity to the base station radio head 1400 using a single cable.

In some aspects, network controller 1435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 1445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 1445 may provide data to application processor 1405 which may include one or more of position data or time data. Application processor 1405 may use time data to synchronize operations with other radio base stations.

In some aspects, user interface 1450 may include one or more of physical or virtual buttons, such as a reset button, one or more indicators such as light emitting diodes (LEDs) and a display screen.

The examples as described herein may be summarized as follows:

An example (e.g., example 1) relates to a computing device. The computing device includes a platform including a first processor, a wireless device coupled to the platform, the wireless device including a second processor, and a plurality of antennas coupled to the wireless device. At least one of the first processor or the second processor is configured to determine characteristics of a platform noise received at the wireless device due to utilization of circuitries and processing components on the platform and implement a measure to mitigate the platform noise based on the determined characteristics of the platform noise.

Another example (e.g., example 2) relates to a previously described example (e.g., example 1), wherein the first processor is configured to monitor the utilization of the circuitries and processing components on the platform, determine the characteristics of the platform noise on each antenna based on the utilization of the circuitries and processing components, determine a noise covariance matrix based on the characteristics of the platform noise, and send one of the noise covariance matrix, an eigen vector having a smallest eigen value of the noise covariance matrix, or an information related to the noise covariance matrix or the eigen vector to the wireless device. The second processor is configured to apply the eigen vector or an inverse of the noise covariance matrix to samples received on the plurality of antennas in time domain.

Another example (e.g., example 3) relates to a previously described example (e.g., example 2), wherein the second processor is configured to apply a noise whitening matrix obtained from the noise covariance matrix in a frequency domain.

Another example (e.g., example 4) relates to a previously described example (e.g., any one of examples 1-3), wherein the second processor is configured to measure a noise power on each antenna or receive information regarding the noise power from the first processor and apply a scaling factor to a received signal on each antenna based on the noise power measured on the antennas.

Another example (e.g., example 5) relates to a previously described example (e.g., example 1), wherein the second processor is configured to measure the characteristics of the platform noise, determine a noise covariance matrix based on the measured characteristics of the platform noise, and apply an eigen vector of the noise covariance matrix having a smallest eigen value to samples received on the plurality of antennas in time domain.

Another example (e.g., example 6) relates to a previously described example (e.g., example 5), wherein the second processor is configured to apply a noise whitening matrix obtained from the noise covariance matrix in a frequency domain.

Another example (e.g., example 7) relates to a previously described example (e.g., example 1), wherein the first processor is configured to determine the characteristics of the platform noise based on the utilization of the circuitries and processing components on the platform and/or application or workload on the platform, generate a spectral mask based on the determined characteristics of the platform noise, and send the spectral mask to the wireless device. The second processor is configured to apply the spectral mask to received samples on the plurality of antennas to scale an amplitude of the received samples in a frequency domain.

Another example (e.g., example 8) relates to a wireless device coupled to a platform of a computing device and a plurality of antennas. The wireless device includes a processor configured to determine characteristics of a platform noise incurred at the wireless device due to utilization of circuitries and processing components on the platform and implement a measure to mitigate the platform noise based on the determined characteristics of the platform noise.

Another example (e.g., example 9) relates to a previously described example (e.g., example 8), wherein the processor is configured to measure a noise power on each antenna or receive information regarding the noise power from the platform and apply a scaling factor to a received signal on each antenna based on the noise power measured on the antennas.

Another example (e.g., example 10) relates to a previously described example (e.g., example 8, wherein the processor is configured to measure the characteristics of the platform noise on the antennas, determine a noise covariance matrix based on the measured characteristics of the platform noise, and apply an eigen vector of the noise covariance matrix having a smallest eigen value or an inverse of the noise covariance matrix to samples received from the plurality of antennas in time domain.

Another example (e.g., example 11) relates to a previously described example (e.g., example 10), wherein the processor is configured to apply a noise whitening matrix obtained from the noise covariance matrix in a frequency domain or in a time domain.

Another example (e.g., example 12) relates to a previously described example (e.g., example 8), wherein the processor is configured to apply a spectral mask received from the platform to received samples on a plurality of antennas to scale an amplitude of the received samples in a frequency domain, wherein the spectral mask is generated by the platform based on utilization of circuitries and processing components on the platform.

Another example (e.g., example 13) relates to a method for mitigating platform noise in a computing device including a platform, a wireless device coupled to the platform, and a plurality of antennas coupled to the wireless device. The method includes determining characteristics of a platform noise received at the wireless device due to utilization of circuitries and processing components on the platform and implementing a measure to mitigate the platform noise based on the determined characteristics of the platform noise.

Another example (e.g., example 14) relates to a previously described example (e.g., example 13), wherein the determining the characteristics of the platform noise and/or the implementing the measure includes one of: (i) receiving information, from the platform, including one of a noise covariance matrix of platform noise incurred at the wireless device due to utilization of circuitries and processing components on the platform, an eigen vector having a smallest eigen value of the noise covariance matrix, or an information related to the noise covariance matrix or the eigen vector, and applying the eigen vector or an inverse of the noise covariance matrix to samples received on the plurality of antennas in time domain; (ii) measuring a noise power on each antenna and applying a scaling factor to a received signal on each antenna based on the noise power measured on the antennas; (iii) measuring the characteristics of the platform noise, determining a noise covariance matrix based on the measured characteristics of the platform noise, and applying an eigen vector of the noise covariance matrix having a smallest eigen value to samples received on the plurality of antennas in time domain; or (iv) receiving a spectral mask from the platform and applying the spectral mask to received samples on a plurality of antennas to scale an amplitude of the received samples in a frequency domain, wherein the spectral mask is generated by the platform based on characteristics of the platform noise estimated by the platform.

Another example (e.g., example 15) relates to a machine-readable medium including code, when executed, to cause a machine to perform any of the methods of examples 13-14.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A computing device, comprising:
a platform including a first processor;
a wireless device coupled to the platform, the wireless device including a second processor; and
a plurality of antennas coupled to the wireless device,
wherein at least one of the first processor or the second processor is configured to determine characteristics of a platform noise received at the wireless device due to utilization of circuitries and processing components on the platform and implement a measure to mitigate the platform noise based on the determined characteristics of the platform noise, and
wherein
(i) the first processor is configured to monitor the utilization of the circuitries and processing components on the platform, determine the characteristics of the platform noise on each antenna based on the utilization of the circuitries and processing components, determine a noise covariance matrix based on the characteristics of the platform noise, and send one of the noise covariance matrix, an eigen vector having a smallest eigen value of the noise covariance matrix, or an information related to the noise covariance matrix or the eigen vector to the wireless device, and the second processor is configured to apply the eigen vector or an inverse of the noise covariance matrix to samples received on the plurality of antennas in time domain,
(ii) the second processor is configured to measure the characteristics of the platform noise, determine a noise covariance matrix based on the measured characteristics of the platform noise, and apply an eigen vector of the noise covariance matrix having a smallest eigen value to samples received on the plurality of antennas in time domain, or
(iii) the first processor is configured to determine the characteristics of the platform noise based on the utilization of the circuitries and processing components on the platform and/or application or workload on the platform, generate a spectral mask based on the determined characteristics of the platform noise, and send the spectral mask to the wireless device, and the second processor is configured to apply the spectral mask to received samples on the plurality of antennas to scale an amplitude of the received samples in a frequency domain.

2. The computing device of claim 1, wherein the second processor is configured to apply a noise whitening matrix obtained from the noise covariance matrix in a frequency domain.

3. The computing device of claim 1, wherein the second processor is configured to measure a noise power on each antenna or receive information regarding the noise power from the first processor and apply a scaling factor to a received signal on each antenna based on the noise power measured on the antennas.

4. The computing device of claim 1, wherein the second processor is configured to apply a noise whitening matrix obtained from the noise covariance matrix in a frequency domain.

5. A wireless device coupled to a platform of a computing device and a plurality of antennas, comprising:
a processor configured to determine characteristics of a platform noise incurred at the wireless device due to utilization of circuitries and processing components on the platform and implement a measure to mitigate the platform noise based on the determined characteristics of the platform noise,
wherein the processor is configured to:
(i) measure the characteristics of the platform noise on the antennas, determine a noise covariance matrix based on the measured characteristics of the platform noise, and apply an eigen vector of the noise covariance matrix having a smallest eigen value or an inverse of the noise covariance matrix to samples received from the plurality of antennas in time domain, or
(ii) apply a spectral mask received from the platform to received samples on a plurality of antennas to scale an amplitude of the received samples in a frequency domain, wherein the spectral mask is generated by the platform based on utilization of circuitries and processing components on the platform.

6. The wireless device of claim 5, wherein the processor is configured to measure a noise power on each antenna or receive information regarding the noise power from the platform and apply a scaling factor to a received signal on each antenna based on the noise power measured on the antennas.

7. The wireless device of claim 5, wherein the second processor is configured to apply a noise whitening matrix obtained from the noise covariance matrix in a frequency domain or in a time domain.

8. A method for mitigating platform noise in a computing device including a platform, a wireless device coupled to the platform, and a plurality of antennas coupled to the wireless device, the method comprising:
determining characteristics of a platform noise received at the wireless device due to utilization of circuitries and processing components on the platform; and
implementing a measure to mitigate the platform noise based on the determined characteristics of the platform noise,
wherein the method further comprises:
(i) receiving information, from the platform, including one of a noise covariance matrix of platform noise incurred at the wireless device due to utilization of circuitries and processing components on the platform, an eigen vector having a smallest eigen value of the noise covariance matrix, or an information related to the noise covariance matrix or the eigen vector, and applying the eigen vector or an inverse of the noise covariance matrix to samples received on the plurality of antennas in time domain,
(ii) measuring the characteristics of the platform noise, determining a noise covariance matrix based on the measured characteristics of the platform noise, and applying an eigen vector of the noise covariance matrix having a smallest eigen value to samples received on the plurality of antennas in time domain, or
(iii) receiving a spectral mask from the platform, and applying the spectral mask to received samples on a plurality of antennas to scale an amplitude of the received samples in a frequency domain, wherein the spectral mask is generated by the platform based on characteristics of the platform noise estimated by the platform.

9. The method of claim 8, further comprising:
measuring a noise power on each antenna; and
applying a scaling factor to a received signal on each antenna based on the noise power measured on the antennas.

10. A non-transitory machine-readable medium including code, when executed, to cause a machine to perform the method of claim 8.

* * * * *